United States Patent
Sato et al.

(10) Patent No.: US 7,525,616 B2
(45) Date of Patent: Apr. 28, 2009

(54) LIQUID CRYSTAL DISPLAY DEVICE HAVING LIQUID CRYSTAL LAYER IN WHICH LIQUID CRYSTAL MOLECULES ARE HOMOGENEOUSLY ORIENTED

(75) Inventors: Hiroki Sato, Tokyo (JP); Mamoru Yoshida, Kunitachi (JP)

(73) Assignee: Casio Computer Co., Ltd., Tokyo (JP)

(*) Notice: Subject to any disclaimer, the term of this patent is extended or adjusted under 35 U.S.C. 154(b) by 571 days.

(21) Appl. No.: 11/389,898

(22) Filed: Mar. 27, 2006

(65) Prior Publication Data
US 2006/0215092 A1   Sep. 28, 2006

(30) Foreign Application Priority Data
Mar. 28, 2005  (JP)  ............... 2005-091641

(51) Int. Cl.
*G02F 1/1335* (2006.01)
(52) U.S. Cl. .......... 349/117; 349/96; 349/99; 349/102; 349/118; 349/119
(58) Field of Classification Search .......... 349/96, 349/99, 102, 117–119, 121
See application file for complete search history.

(56) References Cited
U.S. PATENT DOCUMENTS
7,319,500 B2 * 1/2008 Yoshida et al. ............ 349/96
FOREIGN PATENT DOCUMENTS
JP       2004-334010 A   11/2004
* cited by examiner Primary Examiner—Brian Healy
Assistant Examiner—Michael P Mooney
(74) Attorney, Agent, or Firm—Frishauf, Holtz, Goodman & Chick, P.C.

(57) ABSTRACT

A liquid crystal display device includes first and second aligning films which are respectively arranged on first and second substrates. A liquid crystal layer is provided between the first and the second aligning films. A first polarizing plate is arranged on an opposite side of the first substrate. A second polarizing plate is arranged on an opposite side of the second substrate. A viewing angle compensating film formed of at least one discotic liquid crystal, which the compensating film being arranged in at least one of a part between the first polarizing plate and the first substrate and a part between the second polarizing plate and the second substrate. At least one retardation plate is arranged in at least one of a part between the first polarizing plate and the first substrate and a part between the second polarizing plate and the second substrate.

16 Claims, 10 Drawing Sheets

US 7,525,616 B2

LIQUID CRYSTAL DISPLAY DEVICE HAVING LIQUID CRYSTAL LAYER IN WHICH LIQUID CRYSTAL MOLECULES ARE HOMOGENEOUSLY ORIENTED

CROSS-REFERENCE TO RELATED APPLICATIONS

This application is based upon and claims the benefit of priority from prior Japanese Patent Application No. 2005-091641, filed Mar. 28, 2005, the entire contents of which are incorporated herein by reference.

BACKGROUND OF THE INVENTION

1. Field of the Invention

The present invention relates to a liquid crystal display device having a liquid crystal layer in which liquid crystal molecules are oriented or aligned homogeneously.

2. Description of the Related Art

In order to improve the viewing angle characteristics of a liquid crystal display device, a viewing angle compensating film formed of a discotic liquid crystal has been conventionally used as disclosed in Jpn. Pat. Appln. KOKAI Publication No. 2004-334010.

When the viewing angle compensating film formed of the discotic liquid crystal is used, contrast is improved in respective field directions, i.e., a lateral direction and a vertical direction in a display surface, thereby improving the viewing angle. However, there occurs a problem that the hue of one color varies in accordance with each field direction (which will be referred to as a hue shift in each field direction). That is, in, e.g., white display, its hue differs depending on each field direction, i.e., a vertical direction and a horizontal direction.

BRIEF SUMMARY OF THE INVENTION

It is an object of the present invention to provide a high-display-grade liquid crystal display device in which the viewing angle is improved and a change in hue in each field direction is suppressed.

According to a first aspect of the present invention, there is provided a liquid crystal display device a liquid crystal display device comprising:

a first substrate having at least one first electrode on one side;

a second substrate which has one side to face the one side of the first substrate, and has at least one second electrode which is provided on the one side to face the first electrode;

a first aligning film which is arranged on the one side of the first substrate, and subjected to aligning treatment in a first direction;

a second aligning film which is arranged on the one side of the second substrate, and subjected to aligning treatment in a second direction which is substantially parallel to and opposite to the first direction;

a liquid crystal layer which is provided between the first aligning film and the second aligning film, and in which liquid crystal molecules are arranged in homogeneous alignment substantially without distortion in accordance with the aligning treatment of the first and second aligning films when an electric field is not applied between the first and second electrodes, and which generates retardation which is substantially $\lambda/2$ with respect to transmitted light having a wavelength of $\lambda$;

a first polarizing plate which is arranged on an opposite side of the first substrate, and arranged in such a manner that an optical axis of one of a transmission axis and an absorption axis is substantially matched with a direction crossing the first and second directions of the aligning treatment of the first and second aligning films at substantially 45°;

a second polarizing plate which is arranged on an opposite side of the second substrate, and arranged in such a manner that an optical axis of one of a transmission axis and an absorption axis becomes substantially perpendicular to the optical axis of the first polarizing plate;

a viewing angle compensating film formed of at least one discotic liquid crystal, the compensating film being arranged in at least one of a part between the first polarizing plate and the first substrate and a part between the second polarizing plate and the second substrate in such a manner that an optical axis which is a direction along which a refractive index becomes minimum in a plane parallel to its film surface is set parallel to the first direction and aligned with the aligning treatment applied to the aligning film of the substrate on an adjacent side; and at least one retardation plate which is arranged in at least one of a part between the first polarizing plate and the first substrate and a part between the second polarizing plate and the second substrate in such a manner that at least one of a phase delaying axis which is a direction along which a refractive index becomes maximum and a phase advancing axis which is a direction along which the refractive index becomes minimum in a plane parallel to its plate surface becomes substantially perpendicular to the aligning treatment applied to the aligning film of the substrate on an adjacent side.

Further, according to a second aspect of the present invention, there is provided a liquid crystal display device a liquid crystal display device comprising:

a first substrate having at least one first electrode formed thereon;

a second substrate which is arranged to face an inner surface of the first substrate on which the first electrode is formed, and has at least one second electrode facing the first electrode formed on an inner surface facing the first substrate;

a first aligning film which is subjected to aligning treatment in a predetermined first direction on the inner surface of the first substrate where the first electrode is formed;

a second aligning film which is subjected to aligning treatment in a second direction which is substantially parallel to and opposite to the first direction on the inner surface of the second substrate where the second electrode is formed;

a liquid crystal layer which is held between the first aligning film and the second aligning film, in which liquid crystal molecules are arranged in homogeneous alignment substantially without distortion in accordance with the aligning treatment of the first and second aligning films when an electric field is not applied between the first and second electrodes, and which generates retardation which is substantially $\lambda/2$ with respect to transmitted light having a wavelength of $\lambda$;

a first polarizing plate which is arranged on an outer side of the first substrate, and arranged in such a manner that its transmission axis is substantially matched with a direction crossing the first direction of the aligning treatment applied to the first aligning film of the first substrate at substantially 45°;

a second polarizing plate which is arranged on an outer side of the second substrate, and arranged in such a manner that its transmission axis becomes substantially perpendicular to an optical axis of the first polarizing plate;

a first viewing angle compensating film formed of a discotic liquid crystal which is arranged between the first polarizing plate and the first substrate in such a manner that its optical axis which is a direction along which a refractive index becomes minimum in a plane parallel to its film surface is set parallel to and aligned with the first direction;

a second viewing angle compensating film formed of a discotic liquid crystal which is arranged between the second polarizing plate and the second substrate in such a manner that its optical axis which is a direction along which a refractive index becomes minimum in a plane parallel to its film surface is set parallel to and aligned with the second direction;

a first retardation plate which is arranged between the first polarizing plate and the first viewing angle compensating film in such a manner that its phase delaying axis along which a refractive index becomes maximum in a plane parallel to its plate surface is set substantially parallel to the first direction of the aligning treatment applied to the first aligning film; and a second retardation plate which is arranged between the second polarizing plate and the second viewing angle compensating film in such a manner that its phase delaying axis which is a direction along which a refractive index becomes maximum in a plane parallel to its plate surface becomes substantially perpendicular to the second direction of the aligning treatment applied to the second aligning film.

Furthermore, according to a third aspect of the present invention, there is provided a liquid crystal display device a liquid crystal display device comprising:

a first substrate having at least one first electrode formed thereon;

a second substrate which is arranged to face an inner side of the first substrate where the first electrode is formed, and has at least one second electrode facing the first electrode on an inner side facing the first substrate;

a first aligning film which is subjected to aligning treatment in a predetermined first direction on the inner side of the first substrate where the first electrode is formed;

a second aligning film which is subjected to aligning treatment in a second direction which is substantially parallel to and opposite to the first direction on the inner side of the second substrate where the second electrode is formed;

a liquid crystal layer which is held between the first aligning film and the second aligning film, in which liquid crystal molecules are arranged in homogeneous alignment substantially without distortion in accordance with the aligning treatment of the first and second aligning films when an electric field is not applied between the first and second electrodes, and which generates retardation which is substantially $\lambda/2$ with respect to transmitted light having a wavelength of $\lambda$;

a first polarizing plate which is arranged on an outer side of the first substrate, and arranged in such a manner that its transmission axis is substantially matched with a direction crossing the first direction of the aligning treatment applied to the first aligning film of the first substrate at substantially 45°;

a second polarizing plate which is arranged on an outer side of the second substrate, and is arranged in such a manner that its transmission axis becomes substantially perpendicular to the transmission axis of the first polarizing plate;

a first viewing angle compensating film formed of a discotic liquid crystal which is arranged between the first polarizing plate and the first substrate in such a manner that its optical axis which is a direction along which a refractive index becomes minimum in a plane parallel to its film surface is set parallel to and aligned with the first direction;

a first retardation plate which is arranged between the first polarizing plate and the first viewing angle compensating film in such a manner that its phase delaying axis which is a direction along which a refractive index becomes maximum in a plane parallel to its plate surface is set substantially parallel to the first direction of the aligning treatment applied to the first aligning film;

a second retardation plate which is arranged between the second polarizing plate and the second substrate in such a manner that its phase delaying axis which is a direction along which a refractive index becomes maximum in a plane parallel to its plate surface becomes substantially perpendicular to the second direction of the aligning treatment applied to the second aligning film; and a third retardation plate arranged between the first polarizing plate and the first retardation plate in such a manner that its phase delaying axis which is a direction along which a refractive index becomes maximum in a plane parallel to its plate surface becomes perpendicular to the transmission axis of the first polarizing plate.

According to the liquid crystal display device based on the first aspect of the present invention, the polarizing plates are respectively arranged on both sides with a liquid crystal cell in which liquid crystal molecules are aligned homogeneously (which will be referred to as a homogeneous liquid crystal cell hereinafter) and the viewing angle compensating film therebetween in such a manner that optical axes of the polarizing plates cross an aligning treatment direction of the homogeneous liquid crystal cell at 45°, whereby incident light can be transmitted through the homogeneous liquid crystal cell in an elliptically polarized state. As a result, a degree of a hue shift in each field direction which is apt to be generated due to arrangement of the viewing angle compensating film may be greatly alleviated, thereby stably obtaining high-grade display in which a hue shift is suppressed with a wide viewing angle.

In the liquid crystal display device according to the present invention, it is preferable to provide a structure in which a first viewing angle compensating film formed of a discotic liquid crystal having an optical axis which is arranged parallel to and aligned with a first direction of aligning treatment applied to a first aligning film is provided between the first substrate of the first and second substrates arranged to face each other and a first polarizing plate arranged on the outer side of the first substrate, a first biaxial retardation plate optically having two axes which has a phase delaying axis along which a refractive index becomes maximum in a plane parallel to its plate surface being arranged parallel to the first direction is provided between the first viewing angle compensating film and the first polarizing plate, and one uniaxial retardation plate optically having one axis which has a phase delaying axis being perpendicular to the first direction is provided between the second substrate and the second polarizing plate arranged on the outer side of the second substrate. In this case, it is preferable for refractive index anisotropies $\Delta nr$, $\Delta ng$ and $\Delta ng$ of the biaxial retardation plate for respective wavelengths of red, green and blue to be set in such a manner that a value of a ratio $\Delta nb/\Delta ng$ falls within a range of 1.00 to 1.10 and a value of a ratio $\Delta nr/\Delta ng$ falls within a range of 0.90 to 1.00. It is preferable for refractive index anisotropies $\Delta nr$, $\Delta ng$ and $\Delta nb$ of the uniaxial retardation plate for respective wavelength lights of red, green and blue to be set in such a manner that a value of a ratio $\Delta nb/\Delta ng$ falls within a range of 0.95 to 1.05 and a value of a ratio $\Delta nr/\Delta ng$ falls within a range of 0.95 to 1.05. It is preferable for a value of a product $\Delta n \cdot d$ of a refractive index anisotropy $\Delta n$ and a layer thickness d of the liquid crystal to be set within a range of 280 to 360 nm. As a result, front contrast becomes very high, a change in hue in respective field directions, i.e., the lateral and vertical directions is suppressed, and occurrence of tone reversal in an intermediate tone in a field direction along which the highest contrast can be obtained is effectively constrained.

Moreover, in such a case, it is preferable for a value of in-plane retardation of the uniaxial retardation plate with respect to green light to be set within a range of 115 to 155 nm, a value of in-plane retardation of the biaxial retardation plate with respect to green light to be set within a range of 60 to 140 nm which is less than that of the case of the uniaxial retardation plate by 15 to 55 nm, and refractive indices nx and ny in two directions perpendicular to each other in a plane parallel to the plate surface of the biaxial retardation plate and a refractive index nz in a direction vertical to the plate surface to be set within a value range satisfying −0.4≦(nx−nz)/(nx−ny)≦0.6. As a result, the viewing angle characteristics can be further uniformed in all field directions.

It is preferable that the liquid crystal display device having the first viewing angle compensating film arranged on one side of the liquid crystal layer and the biaxial retardation plate and the uniaxial retardation plate arranged on both sides further includes between the second substrate and the second polarizing plate arranged on the outer side of the second substrate a second viewing angle compensating film formed of a discotic liquid crystal having an optical axis arranged parallel to and aligned with a direction along which the second aligning film is subjected to aligning treatment. Additionally, in this case, it is further preferable for refractive index anisotropies Δnr, Δng and Δnb of the biaxial retardation plate for respective wavelength lights of red, green and blue to be set in such a manner that a value of a ratio Δnb/Δng falls within a range of 1.00 to 1.10 and a value of a ratio Δnr/Δng falls within a range of 0.90 to 1.00. It is further preferable for refractive index anisotropies Δnr, Δng and Δnb of the uniaxial retardation plate for respective wavelength lights of red, green and blue to be set in such a manner that a value of a ratio Δnb/Δng falls within a range of 0.85 to 0.95 and a value of a ratio Δnr/Δng falls with a range of 1.00 to 1.10. It is preferable for a value of a product Δn·d of a refractive index anisotropy Δn and a layer thickness d of the liquid crystal layer to be set within a range of 280 to 360 nm. As a result, in addition to the effect demonstrated by the liquid crystal display device, a change in transmittance at a deep visual angle in each of field directions, i.e., vertical and lateral directions can be reduced since the biaxial retardation plate and the uniaxial retardation plate are respectively arranged on both sides. As a result, a range of the visual field can be increased in substantially all field directions.

Further, in this case, it is preferable that a value of an in-plane retardation Re of each of the biaxial retardation plate and the uniaxial retardation plate is set within a range of 115 to 155 nm and refractive indices nx and ny in two directions perpendicular to each other in a plane parallel to the plate surface of the biaxial retardation plate and a refractive index nz in a direction vertical to the plate surface are respectively set within a range satisfying −0.4≦(nx−nz)/(nx−ny)≦0.6. As a result, the viewing angle characteristics can be further uniformed in all field directions.

Furthermore, it is preferable that the liquid crystal display device having the first viewing angle compensating film arranged on one side of the liquid crystal layer and the first biaxial retardation plate and the uniaxial retardation plate arranged on both sides further includes between the first biaxial retardation plate and the first polarizing plate a second biaxial retardation plate optically having two axes which has a phase delaying axis along which a refractive index becomes maximum in a plane parallel to a plate surface thereof being arranged in a direction crossing a phase delaying axis of the first biaxial retardation plate at an angle of substantially 45°. Moreover, in this case, it is preferable for refractive index anisotropies Δnr, Δng and Δnb of the first biaxial retardation plate and the second biaxial retardation plate for respective wavelength lights of red, green and blue to be set in such a manner that a value of a ratio Δnb/Δng falls within a range of 1.00 to 1.10 nm. It is preferable for refractive index anisotropies Δnr, Δng and Δnb of the uniaxial retardation plate for respective wavelength lights of red, green and blue to be set in such a manner that a value of a ratio Δnb/Δng falls within a range of 0.95 to 1.05 nm and a value of a ratio Δnr/Δng falls within a range of 0.95 to 1.05 nm. It is preferable to set a value of a product Δn·d of a refractive index anisotropy Δn and a layer thickness d of the liquid crystal layer within a range of 280 to 360 nm. As a result, in addition to the effect demonstrated by the liquid crystal display device, occurrence of tone reversal in an intermediate tone in a lower field direction which is a viewing angle direction can be further assuredly suppressed.

Moreover, the present invention is suitable for a color liquid crystal display device in which color filters having a plurality of colors which selectively transmit different wavelength lights therethrough are arranged in accordance with each pixel portion where respective electrodes of the first and second substrates face each other. In this case, it is preferable that a liquid crystal layer thickness is set to different values in accordance with the pixel portions corresponding to the color filters of different colors. As a result, it is possible to obtain a color display quality which has a wide viewing angle in substantially all field directions, no hue shift and excellent color reproducibility.

Additionally, according to the liquid crystal display device based on the second aspect of the present invention, the first and second viewing angle compensating films are arranged on both sides of the liquid crystal cell in which the liquid crystal molecules are homogeneously arranged, and the polarizing plates are arranged on both sides with these films therebetween in such a manner that optical axes of the polarizing plates cross an aligning treatment direction of the homogeneous liquid crystal cell at 45°. As a result, incident light can be transmitted through the homogeneous liquid crystal cell in an elliptically polarized state. Consequently, it is possible to greatly alleviate a degree of a hue shift in each field direction which is apt to occur due to arrangement of the viewing angle compensating films, and high-grade display in which a hue shift is suppressed with a wide viewing angle can be stably obtained, thereby assuredly suppressing occurrence of tone reversal in an intermediate tone in a lower field direction which is a viewing angle direction.

In this case, it is preferable that the first retardation plate is a biaxial retardation plate whose in-plane retardation with respect to green wavelength light is set within a range of 115 to 155 nm. Further, it is preferable that the second retardation plate is a uniaxial retardation plate whose in-plane retardation with respect to green wavelength light is set within a range of 115 to 155 nm.

Furthermore, according to the liquid crystal display device based on the third aspect of the present invention, the first viewing angle compensating film is arranged on one side of the liquid crystal cell in which liquid crystals are homogeneously oriented, the biaxial retardation plate and the uniaxial retardation plate are respectively arranged on both sides, and the polarizing plates are respectively arranged on both sides with these members therebetween in such a manner that optical axes of the polarizing plates cross an aligning treatment direction of the homogeneous liquid crystal cell at 45°. As a result, incident light can be transmitted though the homogeneous liquid crystal cell in an elliptically polarized state. Consequently, it is possible to greatly alleviate a degree of a hue shift in each field direction which is apt to be generated due to arrangement of the viewing angle compensating films, high-grade display in which a hue shift is suppressed with a wide viewing angle can be stably obtained, occurrence of tone reversal in an intermediate tone in a lower field direction which is a viewing angle direction can be further assuredly suppressed, and a change in transmittance at a deep viewing angle can be reduced in respective field directions, i.e., vertical and horizontal directions, thereby increasing a range of a visual field in substantially all field directions.

In this case, it is preferable that the third retardation plate is a biaxial retardation plate whose in-plane retardation with respect to green wavelength light is set within a range of 115 to 155 nm, and that refractive indices nx and ny of the biaxial retardation plate in two directions perpendicular to each other in a plane parallel to the plate surface and a refractive index nz in a direction vertical to the plate surface are set in such a manner that a value of (nx−nz)/(nx−ny) is set to a value satisfying a range of 0.5 to 1.5.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1C is an explanatory view showing an optical function at the time of on;

FIGS. 3A and 3B are chromaticity distribution maps showing each chromaticity of a white color, a gray color with a 20% tone and a gray color with a 50% tone at a viewing angle of 45° in each field direction, in which FIG. 3A shows chromaticity distribution characteristics of the liquid crystal display device and FIG. 3B shows chromaticity distribution characteristics of a liquid crystal display device as a comparative example;

FIGS. 6A and 6B are graphs showing a change in transmittance with respect to a viewing angle at the time of on in the respective liquid crystal display devices according to the first embodiment and the second embodiment, in which FIG. 6A shows a change in transmittance with respect to a viewing angle in a lateral direction and FIG. 6B shows a change in transmittance with respect to a viewing angle in a vertical direction;

DETAILED DESCRIPTION OF THE INVENTION

First Embodiment

Figure 1A:
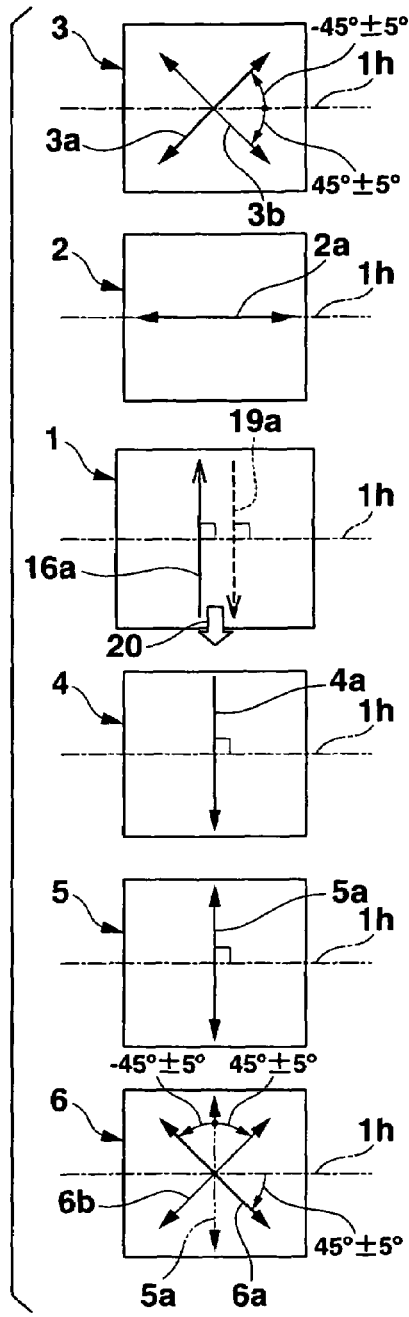
FIG. 1A is an exploded plan view showing a liquid crystal display device according to a first embodiment of the present invention.
Figure 2:
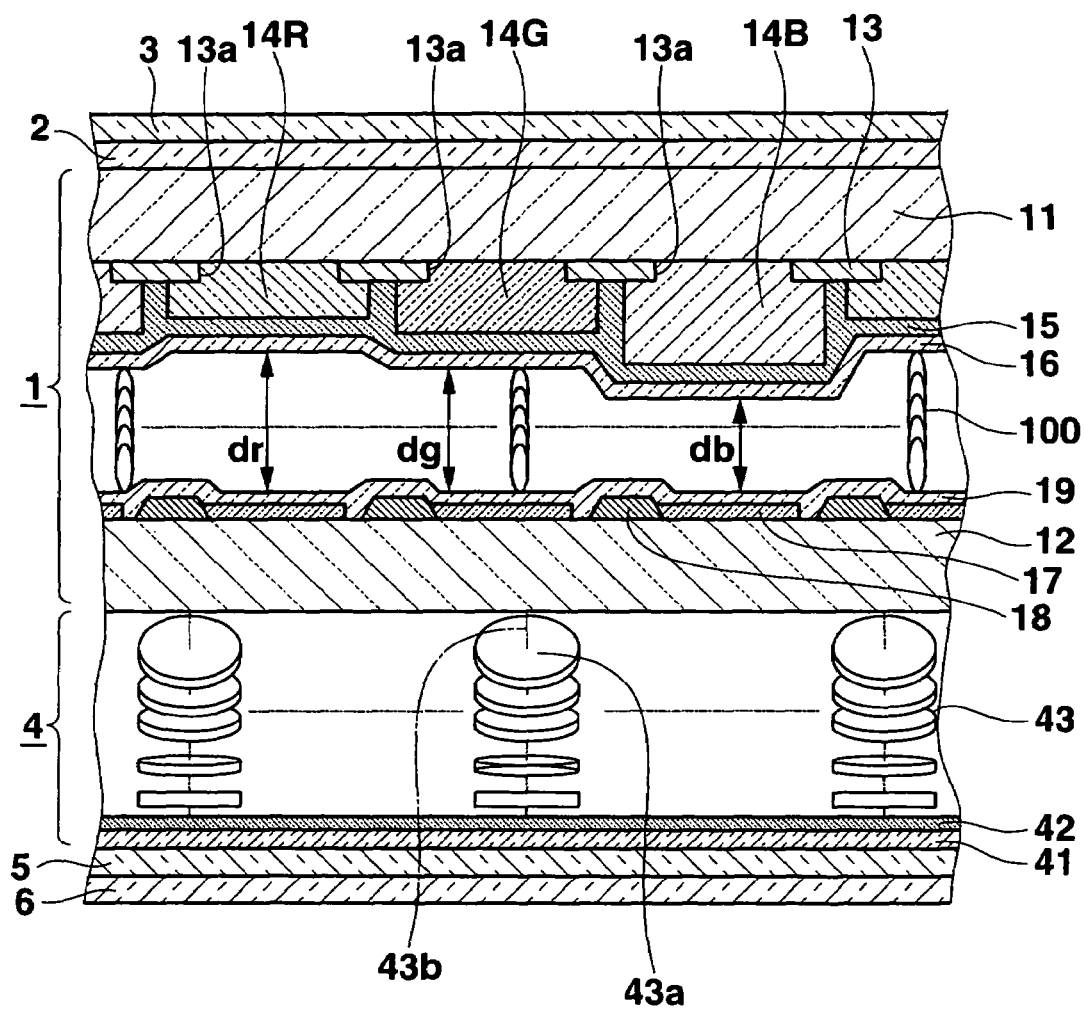
FIG. 2 is a partially enlarged schematic cross-sectional view showing an internal configuration of the liquid crystal display device.

FIG. 1A is an exploded plan view showing an optical configuration of a liquid crystal display device according to a first embodiment of the present invention, and FIG. 2 is an enlarged schematic cross-sectional view showing an internal configuration of this liquid crystal display device.

The liquid crystal display device according to this embodiment is an active matrix type liquid crystal display device. As shown in FIGS. 1A and 2, a front retardation plate 2 and a front polarizing plate 3 each having a rectangular shape are sequentially arranged on a front side which is an observation side of display with a liquid crystal cell 1 having a rectangular plane outer shape therebetween. A viewing angle compensating film 4, a rear retardation plate 5 and a rear polarizing plate 6 each having a rectangular shape are sequentially arranged on a rear side.

The liquid crystal cell 1 is a homogeneous liquid crystal cell. In the liquid crystal cell 1, as shown in FIG. 2, a pair of front and rear glass substrates 11 and 12 are joined with a predetermined gap therebetween by a frame-like sealing material (not shown). A liquid crystal 100 in which liquid crystal molecules are oriented homogeneously without distortion is sealed in a space surrounded by the frame-like sealing material between the front and rear glass substrates 11 and 12.

A black mask 13 having a plurality of openings 13a corresponding to pixels formed therein is set on an opposed surface (an inner surface) of the front glass substrate 11 of the pair of joined glass substrates 11 and 12.

Three types of red, green and blue color filters 14R, 14G and 14B are set in the respective openings 13a of the black mask 13 in a predetermined arrangement. Here, each color filter 14R, 14G or 14B is provided with an area larger than each opening 13a by an amount corresponding to an appropriate length and width over an entire circumference, and set with a rim portion thereof superimposed on each opening edge portion of the black mask 13. Respective thicknesses of the color filters 14R, 14G and 14B are set to different values in such a manner that liquid crystal layer thicknesses (cell gaps) dr, dg and db in respective pixels where the respective color filters 14R, 14G and 14B are arranged become layer thicknesses which can cancel a difference in refractive index anisotropy with respect to each transmitted wavelength light. An optimized structure having the liquid crystal layer thicknesses (which will be referred to as a multigap structure hereinafter) will be described later in detail.

A common electrode 15 formed of one transparent electroconductive film having a film shape which collectively covers the respective red, green and blue color filters 14R, 14G and 14B having different thicknesses is attached on surfaces of these color filters. A front homogeneous aligning film 16 which restricts alignment of the liquid crystal molecules is uniformly attached on an exposed surface of this common electrode 15. An exposed or inner surface of this front homogeneous aligning film 16 is subjected to aligning treatment in a direction indicated by an arrow 16a (FIG. 1A) perpendicular to a lateral direction (a horizontal direction) 1h of a display surface by a rubbing method.

A plurality of pixel electrodes 17 formed of a transparent electroconductive film are arranged in a matrix form on an inner surface of the rear glass substrate 12. A thin film transistor 18 as an active element is electrically connected with each pixel electrode 17. One pixel is defined by a region in which each pixel electrode 17 faces the common electrode 15, and each pixel corresponds to each opening 13a of the black mask 13. A rear homogeneous aligning film 19 is uniformly provided on an inner sided of the substrate 12 to cover all the pixel electrodes 17 or thin film transistors 18 and others. As shown in FIG. 1A, this rear homogeneous aligning film 19 is subjected to aligning treatment parallel to the aligning treatment direction 16a of the front homogeneous aligning film 16 toward an opposite direction 19a by the rubbing method.

In an initial state where an electric field is not applied, the respective liquid crystal molecules of the liquid crystal 100 held between the front and rear homogeneous aligning films 16 and 19 subjected to aligning treatment as mentioned above undergo alignment restricting forces in the directions 16a and 19a of the aligning treatment applied to both the homogeneous aligning films 16 and 19, and are oriented homogeneously without distortion.

That is, the respective liquid crystal molecules undergo the alignment restricting forces of the front and rear homogeneous aligning films 16 and 19, and are arranged with their alignment directions being aligned from a surface of the rear homogeneous aligning film 19 toward a surface of the front homogeneous aligning film 16 in a state where the liquid crystal molecules are inclined at a predetermined pre-tilt angle along the respective aligning treatment directions 16a and 19a. In this liquid crystal display device, a direction along which long-axis directions of the respective liquid crystal molecules are aligned and indicated as a direction 20 by an outline arrow is a viewing angle direction along which the best contrast can be obtained.

A refraction index anisotropy of the liquid crystal layer 100 in which the liquid crystal molecules are aligned homogeneously as described above has wavelength dependence which varies depending on a wavelength of transmitted light. Therefore, in order to perform color display with high color reproducibility, liquid crystal layer thicknesses which differ in accordance with a pixel of each color are set so that a birefringence function which is substantially λ/2 is given to each wavelength light of red, green or blue transmitted through the liquid crystal layer 100.

The birefringence function of the liquid crystal layer 100 is demonstrated based on a product $\Delta n \cdot d$ of a refractive index anisotropy $\Delta n$ and a layer thickness d of a liquid crystal material. Therefore, in the liquid crystal cell 1 according to this embodiment, the liquid crystal layer thickness dr, dg or db for each pixel of red, green or blue is set in such a manner that $\Delta n \cdot d$ falls within a range of 280 to 360 nm in accordance with the refractive index anisotropy $\Delta n$ with respect to each wavelength light.

In this embodiment, for example, film thicknesses of the respective color filters 14R, 14G and 14B are set in such a manner that both the liquid crystal layer thicknesses dr and dg for the respective pixels where the red color filter 14R and the green color filter 14G are arranged become 3.8 μm and the liquid crystal layer thickness db of the pixel where the blue color filter 14B is arranged becomes 3.6 μm.

The front retardation plate 2 arranged on the outer surface of the front glass substrate 11 of the liquid crystal cell 1 is a uniaxial retardation plate whose in-plane retardation with respect to light having a wavelength of 540 nm (green wavelength light) is 135±20 nm (i.e., 115 to 155 nm). As shown in FIG. 1A, the front retardation plate 2 is set in such a manner that its phase delaying axis 2a is positioned parallel to a lateral direction 1h of a display surface (which will be simply referred to as a lateral direction hereinafter). Therefore, the phase delaying axis 2a is perpendicular to the direction 16a of the aligning treatment applied to the front homogeneous aligning film of the liquid crystal cell 1.

Here, in regard to a refractive index anisotropy $\Delta n$ of the front retardation plate 2 for each transmitted wavelength light, a ratio of a refractive index anisotropy $\Delta nb$ with respect to blue wavelength light and a refractive index anisotropy $\Delta ng$ with respect to green wavelength light is as follows:

$\Delta nb/\Delta ng = 1.00 \pm 0.05$

A ratio of a refractive index anisotropy $\Delta nr$ with respect to red wavelength light and the refractive index anisotropy $\Delta ng$ with respect to green wavelength light is as follows:

$\Delta nr/\Delta ng = 1.00 \pm 0.05$

Values of the respective refractive index anisotropies differ within a range of 10%.

That is, as to the refractive index anisotropies $\Delta nr$, $\Delta ng$ and $\Delta nb$ of the uniaxial retardation plate for the respective red, green and blue wavelength lights, a value of the ratio $\Delta nb/\Delta ng$ is set within a range of 0.95 to 1.05 mm, and a value of the ratio $\Delta nr/\Delta ng$ is set within a range of 0.95 to 1.05 nm, respectively.

The front polarizing plate 3 set on the observation side (which will be referred to as a front side hereinafter) of the front retardation plate 2 is set in such a manner that its transmission axis 3a is positioned in a direction crossing the lateral direction 1h at −45° (a clockwise direction is determined as +). Therefore, an absorption axis 3b of the front polarizing plate 3 crosses the lateral direction 1h at +45°. It is to be noted that set angles of these transmission axis 3a and absorption axis 3b respectively have an error range of ±5°.

The viewing angle compensating assembly 4 arranged on the outer side of the rear glass substrate 12 of the liquid crystal cell 1 is obtained by forming an aligning film 42 on one surface of a transparent film substrate 41 and superimposing a discotic liquid crystal layer 43 on a surface of this aligning film 43 as shown in FIG. 2. In the discotic liquid crystal layer 43, discotic liquid crystal molecules 43a each having a disc shape are arranged in a state where respective molecular axes 43b vertical to disc surfaces of these molecules are aligned in a predetermined direction and inclined while changing individual angles. A direction along which each molecular axis 43b is inclined is a direction along a direction of aligning treatment applied to the aligning film 42. In this case, the discotic liquid crystal molecules 43a close to the aligning film 42 are aligned in such a manner that their molecular disc surfaces are aligned substantially parallel to the film substrate 41, and an inclination angle, i.e., a tilt angle of a disc surface of each discotic liquid crystal molecule 43a with respect to the film substrate 41 is increased as distanced from the surface of the aligning film 42. That is, the discotic liquid crystal layer 43 has an optical axis along which a refractive index becomes minimum in a direction obtained by averaging the inclination angles of the molecular axes 43b of the respective discotic liquid crystal molecules 43a, and demonstrates a negative optical anisotropy in which a direction along which a refractive index becomes minimum is determined as an alignment axis on a plane parallel to a film surface of this viewing angle compensating film.

In this embodiment, as shown in FIG. 1A, the viewing angle compensating film 4 is set in such a manner that its alignment axis 4a is positioned in a direction perpendicular to the lateral direction 1h and that its direction is aligned with the direction 19a of the aligning treatment applied to the rear homogeneous aligning film of the liquid crystal cell 1.

The rear retardation plate 5 arranged on the rear side of the viewing angle compensating film 4 is a biaxial retardation plate optically having one axis. As shown in FIG. 1A, the rear retardation plate 5 is set in such a manner that its phase delaying axis 5a becomes perpendicular to the lateral direction 1h. Therefore, the phase delaying axis 5a is parallel to the direction 19a of the aligning treatment applied to the rear homogeneous aligning film 19 of the liquid crystal cell 1.

Here, respective refractive indices nx, ny and nz of the rear retardation plate 5 in three directions perpendicular to each other are set to satisfy the following relationship:

$$(nx-nz)/(nx-ny)=0.10\pm0.5$$

Further, in regard to a refractive index anisotropy Δn for each transmitted wavelength light, a ratio of a refractive index anisotropy Δnb with respect to blue wavelength light and a refractive index anisotropy Δng with respect to green wavelength light is as follows:

$$\Delta nb/\Delta ng=1.05\pm0.05$$

A ratio of a refractive index anisotropy Δnr with respect to red wavelength light and the refractive index anisotropy Δng with respect to green wavelength light is as follows:

$$\Delta nr/\Delta ng=0.95\pm0.05$$

That is, as to the refractive index anisotropies Δnr, Δng and Δnb of the rear retardation plate 5 for the respective red, green and blue wavelength lights, a value of the ratio Δnb/Δng is set within a range of 1.00 to 1.10, and a value of the ratio Δnr/Δng is set within a range of 0.90 to 1.00. As to the refractive index anisotropies Δnr, Δng and Δnb of the uniaxial retardation plate for the respective red, green and blue wavelength lights, a value of the ratio Δnb/Δng is set within a range of 0.85 to 0.95, and a value of the ratio Δnr/Δng is set within a range of 1.00 to 1.10. A value of the product Δn·d of the refractive index anisotropy Δn and the layer thickness d of the liquid crystal layer is set within a range of 280 to 360 nm.

The value of in-plane retardation of the rear retardation plate 5 formed by a biaxial retardation plate with respect to light of 540 nm wavelength (green light) is set to be a range less than that of the value of in-plane retardation of the front retardation plate 2 formed by a uniaxial retardation plate with respect to green light, by 35 nm±20 nm (15 to 55 nm). That is, the value of in-plane retardation of the front retardation plate 2 with respect to green light is set within a range of 115 to 155 nm, so that the value of in-plane retardation of the rear retardation plate 5 with respect to green light is set within a range of 60 to 140 nm. The rear polarizing plate 6 set on the rear side of the rear retardation plate 5 is arranged in such a manner that its transmission axis 6a becomes perpendicular to the transmission axis 3a of the front polarizing plate 3. Therefore, the transmission axis 6a crosses the horizontal direction 1h at +45±5°, and crosses the phase delaying axis 5a of the rear retardation plate 5 at −45±5°. Further, its absorption axis 6b crosses the phase delaying axis 5a of the rear retardation plate 5 at +45±5°.

Functions and effects in this thus configured liquid crystal display device will now be described. A description will be given mainly based on FIGS. 1B and 1C. Here, FIG. 1B shows an optical function at the time of off where an electric field is not applied to the liquid crystal layer, and FIG. 1C shows an optical function at the time of on where a sufficiently large electric field is applied to the liquid crystal layer.

Figure 1B:
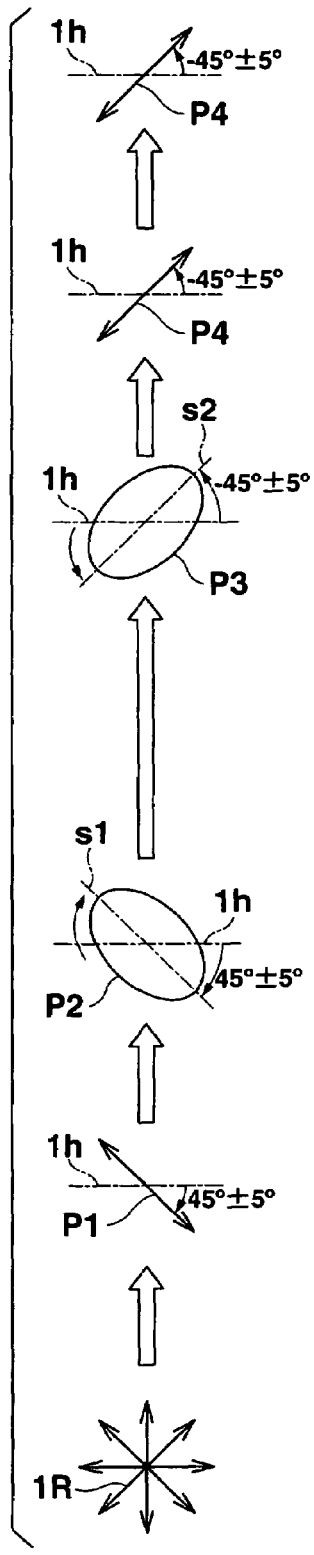
FIG. 1B is an explanatory view showing an optical function at the time of off.
Figure 1C:
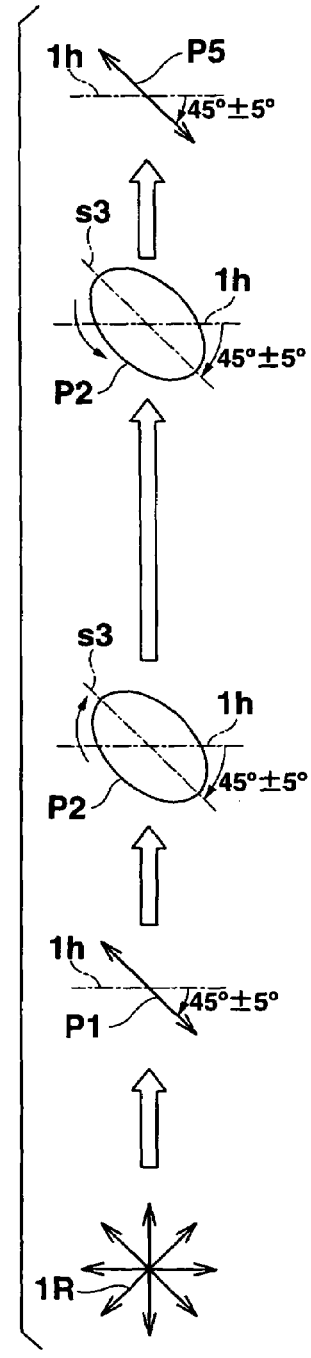

At the time of off, as shown in FIG. 1B, non-polarized light 1R such as natural light or irradiation light from a light source is transmitted through the rear polarizing plate 6 to become linear polarized light P1 whose polarized plane is parallel to the transmission axis 6a of the rear polarizing plate 6, and enters the rear retardation plate 5. Since the polarized plane of the incident linear polarized light P1 crosses the phase delaying axis 5a of the rear retardation plate 5 at 45°, the linear polarized light P1 turns to elliptic polarized light P2 by a birefringence function of the rear retardation plate 5 and a birefringence function of the viewing angle compensating film 4, and exits from the viewing angle compensating film 4.

A retardation which is ½ of a wavelength λ is given to the elliptic polarized light P2 transmitted through the viewing angle compensating film 4 by a birefringence function of the homogeneous liquid crystal cell 1 when transmitted through this cell. As a result, a direction s1 of an elliptic long axis of the elliptic polarized light P2 is rotated 90°, and the elliptic polarized light P2 exits as elliptic polarized light P3 having an opposite direction s2 of the elliptic long axis.

The elliptic polarized light P3 enters the front retardation plate 2 in a state where its elliptic long axis direction crosses the phase delaying axis 2a of the front retardation plate 2 at −45°, undergoes a birefringence function of the front retardation plate 2 when transmitted therethrough, and exits as linear polarized light P4 having a polarized plane parallel to the elliptic long axis direction of the elliptic polarized light P3.

That is, a direction of the polarized plane of the linear polarized light P4 is a direction crossing the lateral direction 1h of the display surface at −45°, and this direction is a direction parallel to the transmission axis 3a of the front polarizing plate 3. Therefore, the linear polarized light P4 is transmitted through the front polarizing plate 3 as it is, thereby performing bright display (white display).

In this manner, at the time of off where an electric field is not applied, the homogeneous type liquid crystal cell 1 rotates a direction of the elliptic long axis of the elliptic polarized light P2 at 90°, and functions as a birefringent optical element which converts the elliptic polarized light P2 into elliptic polarized light in an opposite direction to perform white display. As described above, the homogeneous type liquid crystal cell 1 according to this embodiment allows incidence of the elliptic polarized light to control a polarized state of this elliptic polarized light. Therefore, the dependence of the birefringence on a field direction is alleviated, and a change in hue in accordance with respective field directions, i.e., lateral and vertical directions can be effectively suppressed.

Figure 3A:
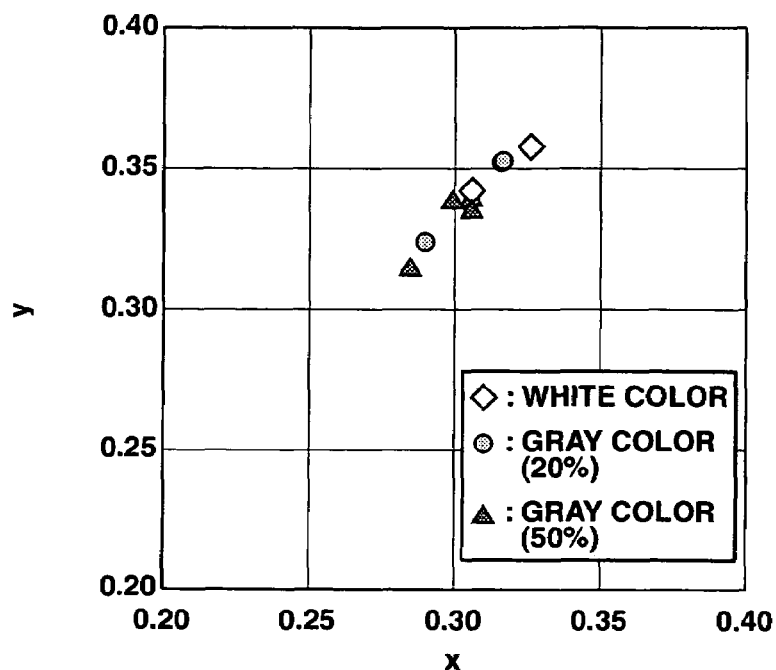
Figure 3B:
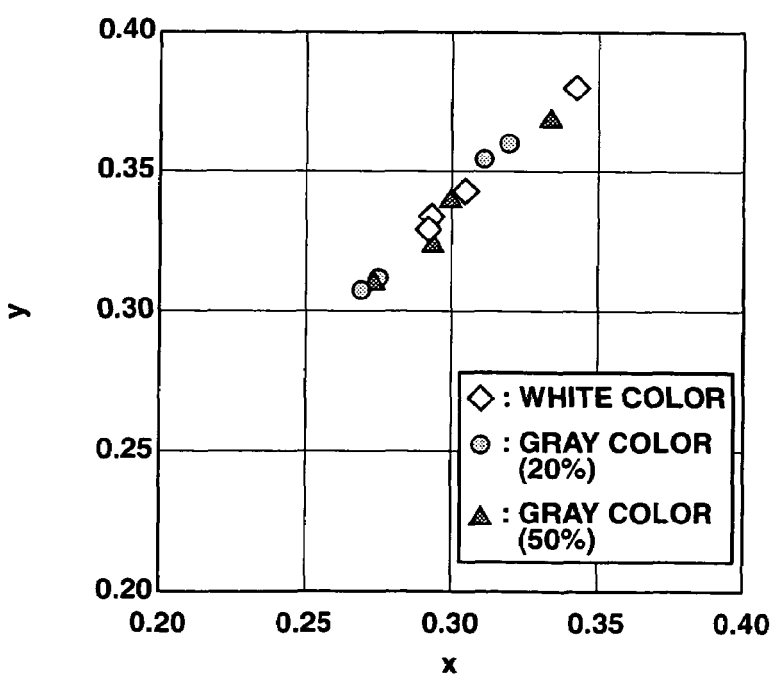
Figure 10:
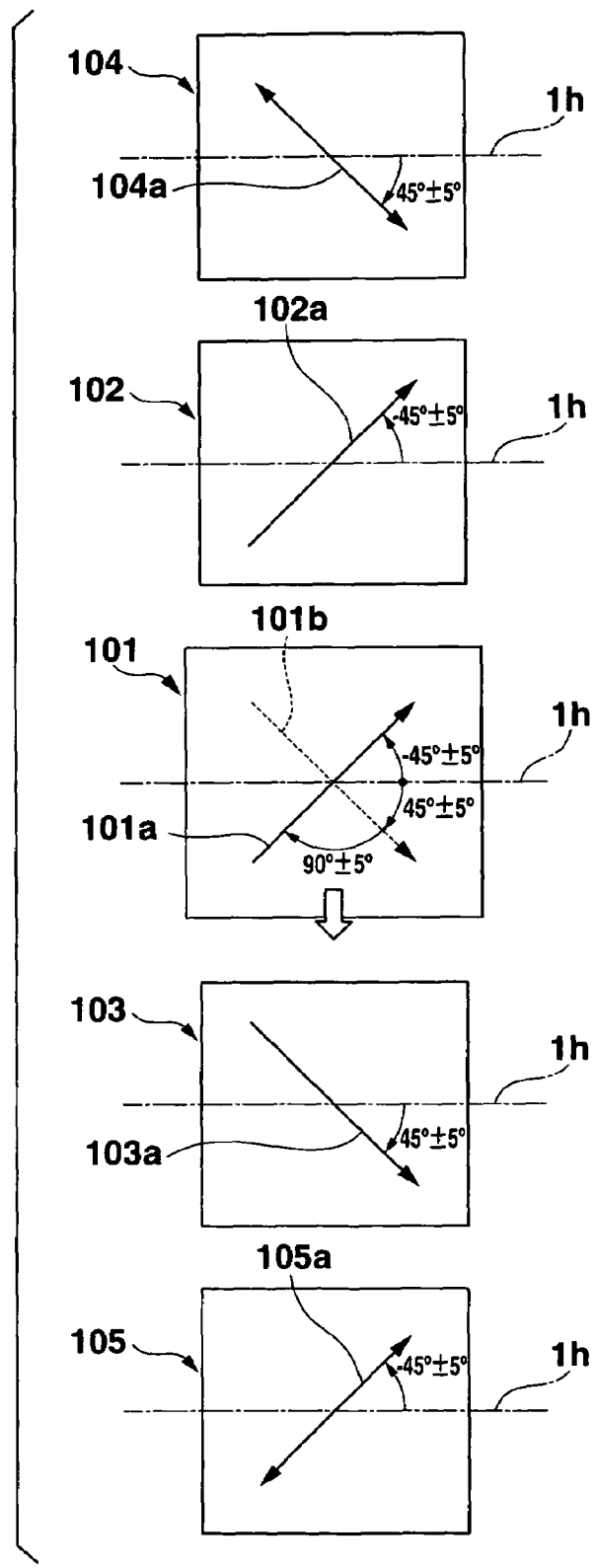
FIG. 10 is an exploded plan view showing a liquid crystal display device according to a comparative example.

FIGS. 3A and 3B are CIE chromaticity diagrams showing respective chromaticities of a white color, a gray color with a 20% tone and a gray color with a 50% tone at a viewing angle of 45° in respective field directions, i.e., vertical and lateral directions in the liquid crystal display device according to this embodiment and a liquid crystal display device as a comparative example. It is to be noted that, as shown in FIG. 10, the liquid crystal display device according to the comparative example has a configuration in which a front viewing angle compensating film 102 and a rear viewing angle compensating film 103 are respectively arranged on both sides of a TN type liquid crystal cell 101 in which liquid crystal molecules are twist-oriented at 90° therebetween in such a manner that their alignment axes 102a and 103a are respectively positioned parallel to directions 101a and 101b of aligning treatment applied to aligning films on corresponding sides, and front and rear polarizing plates 104 and 105 are further arranged on both sides in such a manner that their respective transmission axes 104a and 105a are respectively set to be perpendicular to the respective alignment axes 102a and 103a of the viewing angle compensating films 102 and 103 on the corresponding sides.

As apparent from FIG. 3A, according to the liquid crystal display device of this embodiment, irregularities in chromaticities of the white color, the gray color with the 20% tone and the gray color with the 50% tone at the viewing angle of 45° in the respective field directions, i.e., the vertical and lateral directions are reduced as compared with the case where the liquid crystal display device of the comparative example shown in FIG. 3B is used. As a result, a hue shift is substantially evenly suppressed in all field directions, thereby obtaining high-grade color display superior in color reproducibility.

On the other hand, at the time of on where an electric field is sufficiently applied to the liquid crystal layer 100 of the homogeneous type liquid crystal cell 1 in order to effect dark display, the liquid crystal molecules in the liquid crystal layer 100 rise in a direction vertical to the substrate (an electric field direction), and birefringence of the homogeneous type liquid crystal cell 1 is substantially eliminated.

Therefore, as shown in FIG. 1C, like the time of off, non-polarized irradiation light 1R is sequentially transmitted through the rear polarizing plate 6, the rear retardation plate 5 and the viewing angle compensating film 4 to turn to elliptic polarized light P2 whose long-axis polarized plane s3 crosses the lateral direction 1h at 45°, and enters the liquid crystal cell 1.

At this time, since an electric field is applied to the liquid crystal layer 100 of the liquid crystal cell 1 and hence the liquid crystal layer 100 enters an alignment state where the respective liquid crystal molecules rise in a direction substantially vertical to surfaces of the substrates 11 and 12, the incident elliptic polarized light P2 is not affected by the birefringence function. Therefore, the incident elliptic polarized light P2 exits without substantially changing the polarized state.

The elliptic polarized light P2 which has exited from the liquid crystal cell 1 undergoes a birefringence function of the front retardation plate 2 when transmitted through the next front retardation plate 2, and exits as linear polarized light P5. A direction of a polarized plane of this exiting linear polarized light P5 is a direction parallel to the long-axis polarized plane s3 of the incident elliptic polarized light P2, i.e., a direction crossing the lateral direction 1h at 45°.

Although the linear polarized light P5 which has exited from the front retardation plate 2 enters the front polarizing plate 3, a direction of its polarized plane is a direction perpendicular to the transmission axis 3a of the front polarizing plate 3, i.e., a direction parallel to the transmission axis 3b of the same. Therefore, the linear polarized light P5 is absorbed here, and hence it does not exit. As a result, dark display (black display) is performed.

In this manner, at the time of on where an electric field is applied, the liquid crystal molecules rise substantially vertically with respect to the surfaces of the substrates, the alignment state which does not exercise the birefringence function with respect to the transmitted light is provided, and the elliptic polarized light P2 is transmitted through the liquid crystal cell 1 without changing a direction of the polarized plane s3, thereby obtaining dark display.

In the standing alignment state of the liquid crystal molecules, the liquid crystal molecules in the vicinity of both the homogeneous aligning films 16 and 19 further intensively undergo alignment restricting forces by both the homogeneous aligning films 16 and 19 as compared with the liquid crystal molecules at the central part. Therefore, the liquid crystal molecules in the vicinity of the homogeneous aligning films 16 and 19 cannot vertically rise like the liquid crystal molecules at the central part, and are oriented in an inclined state. Therefore, light affected by the birefringence function (residual retardation) by the obliquely oriented liquid crystal molecules changes a direction of its polarized plane, and hence this light exits without being absorbed by the front polarizing plate 3. As a result, a transmittance of black display is increased and contrast is lowered.

However, in the liquid crystal display device according to this embodiment, since the viewing angle compensating film 4 formed of the discotic liquid crystal is set in such a manner that its alignment axis 4a is positioned parallel to the aligning treatment directions 16a and 19a of the liquid crystal molecules, the residual retardation is effectively compensated, and a transmittance is sufficiently reduced at the time of on (an applied voltage is approximately 4.4V) as shown in FIG. 3, whereby front contrast becomes very high.

Figure 4:
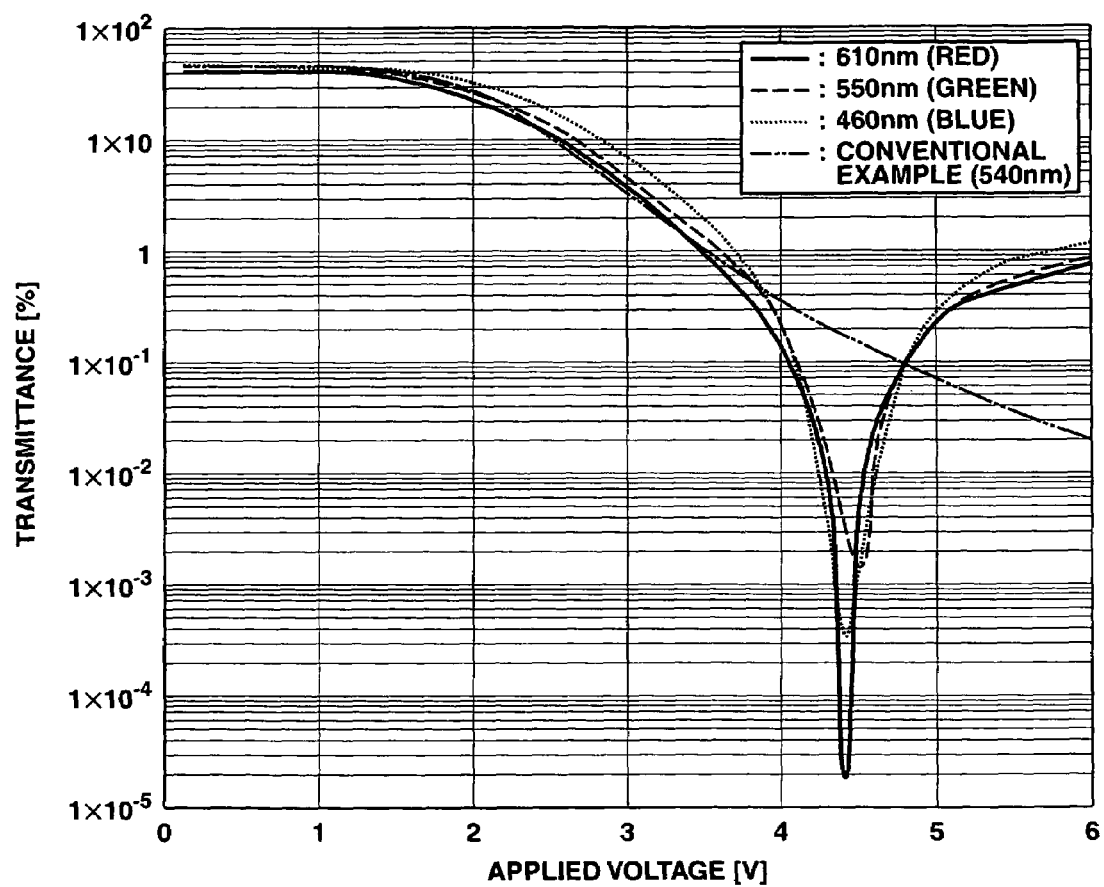
FIG. 4 is a graph showing characteristics of a change in transmittance with respect to an applied voltage in accordance with each wavelength light in the liquid crystal display device.

FIG. 4 is a graph showing a change in transmittance of this liquid crystal display device for each wavelength light with respect to an applied voltage, and a vertical axis representing a transmittance is a logarithmic scale. A two-dots chain line indicates transmittance characteristics of green wavelength light by the TN type liquid crystal display device according to the comparative example shown in FIG. 10. In this liquid crystal display device, as apparent from this transmittance characteristic figure, a transmittance with respect to the green wavelength light when an electric field is applied (at the time of on) with an applied voltage of approximately 4.4V is suddenly reduced to 0.002% which is approximately 1/100 of approximately 0.2% which is a transmittance when the same applied voltage is used in the comparative example. As a result, a transmittance when an electric field is not applied (at the time of off) is substantially the same, and hence front contrast is increased approximately hundredfold.

As described above, in the liquid crystal display device according to this embodiment, the front retardation plate 2 as well as the front polarizing plate 3, and the rear retardation plate 5 as well as the rear polarizing plate 6 are respectively arranged on both sides of the homogeneous liquid crystal cell 1 having the set file angle compensating film 4 therebetween in such a manner that their optical axes cross at 45°, and the respective polarizing plates 3 and 6 are arranged on the outer sides. Therefore, incident light can be transmitted through the homogeneous liquid crystal cell in the elliptic polarized light state. As a result, a degree of a change in hue in respective field directions, i.e., the lateral and vertical directions can be effectively alleviated, thereby stably obtaining a high display grade in which front contrast is high and a hue shift in each field direction is suppressed.

Further, in order to reduce the wavelength dependence of the liquid crystal molecules on the refractive index anisotropy, the front and rear retardation plates 2 and 5 which are arranged with the homogeneous liquid crystal cell 1 and the viewing angle compensating film 4 therebetween are placed in accordance with the ratios of the refractive index anisotropies $\Delta nr$, $\Delta ng$ and $\Delta nb$ of the front and rear retardation plates 2 and 5 in accordance with the respective red, green and blue wavelength lights. As a result, it is possible to reduce a display defect such as a color shift based on the wavelength dependence of the liquid crystal molecules on the refractive index anisotropy. Consequently, the liquid crystal display device which can obtain high-grade color display superior in color reproducibility and viewing angle characteristics can be inexpensively manufactured while reducing a member cost or the number of manufacturing steps.

Furthermore, of the front and rear retardation plates 2 and 5 arranged with the homogeneous liquid crystal cell 1 therebetween, the rear retardation plate is the biaxial retardation plate having refractive indices in three directions perpendicular to each other falling within a predetermined value range. Therefore, a viewing angle of the liquid crystal display device according to this embodiment can be substantially uniformly increased in all field directions, and it is possible to effectively suppress occurrence of tone reversal in an intermediate tone in the viewing angle direction 20 which is apt to be generated due to use of the homogeneous liquid crystal cell 1.

In the foregoing embodiment, although the viewing angle compensating film 4 is arranged on the rear side of the homogeneous liquid crystal cell 1 provided on the same side as the rear retardation plate 5 as the biaxial retardation plate, it may be arranged on the same side as the front retardation plate 2 as the uniaxial retardation plate, i.e., between the front retardation plate 2 and the homogeneous liquid crystal cell 1. Even if such a configuration is adopted, the effects to be obtained are the same.

Second Embodiment

A second embodiment according to the present invention will now be described with reference to FIGS. 5 to 7. It is to be noted that like reference numerals denote constituent elements equal to those in the first embodiment, thereby eliminating their explanation.

Figure 5:
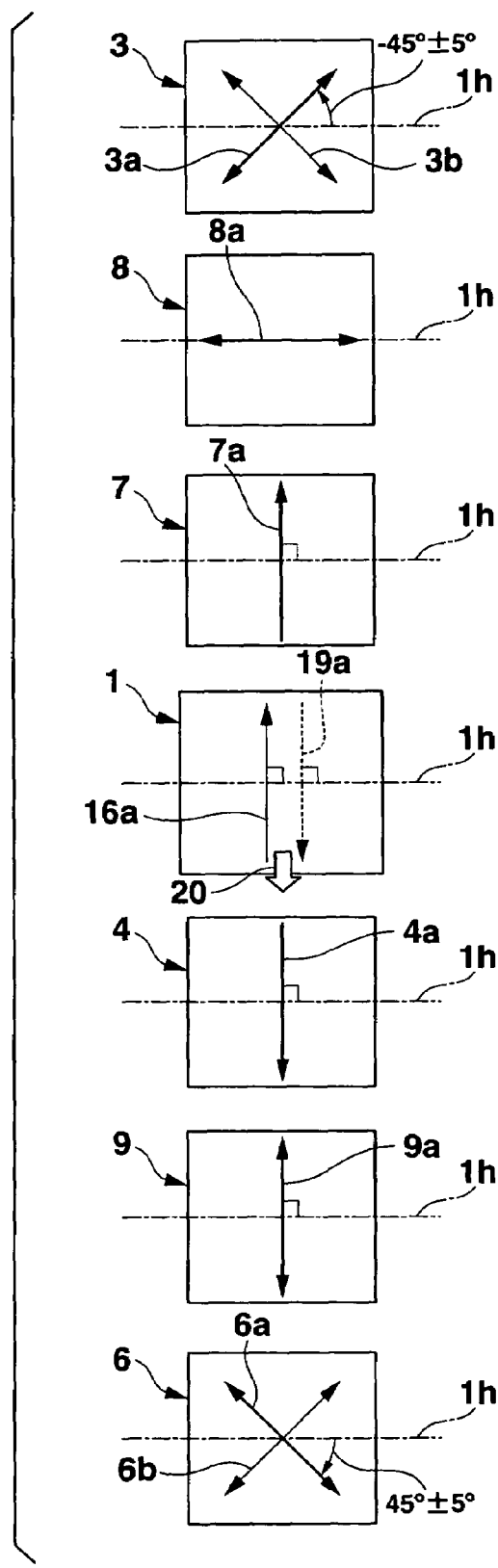
FIG. 5 is an exploded plan view showing a liquid crystal display device as a second embodiment of the present invention.

As shown in FIG. 5, a configuration of the liquid crystal display device according to this embodiment in which a pair of front and rear polarizing plates 3 and 6 are arranged on the outermost sides with a homogeneous liquid crystal cell 1 and a viewing angle compensating film or assembly 4 therebetween is the same as that in the first embodiment. However, a viewing angle compensating film 7 is further additionally arranged on the front side, the homogeneous liquid crystal cell 1 is sandwiched between the pair of front and rear viewing angle compensating films 7 and 4, a front retardation plate 8 is set between the front polarizing plate 3 and the front viewing angle compensating film 7, and a rear retardation plate 9 is set between the rear polarizing plate 6 and the rear viewing angle compensating film 4. Here, a multigap structure of the homogeneous liquid crystal cell 1 is the same as the structure in the first embodiment, and a value of Δn·d of each pixel of red, green or blue is set to fall within a range of 280 to 360 nm.

The additionally arranged front assembly 7 is a viewing angle compensating film formed of the same discotic liquid crystal as that of the rear viewing angle compensating film 4, and it is set in such a manner that its alignment axis 7a is arranged parallel to and aligned with a direction 16a of aligning treatment applied to a homogeneous aligning film on a corresponding side of the homogeneous liquid crystal cell 1.

That is, in this embodiment, the pair of front and rear viewing angle compensating films 7 and 4 are set with the homogeneous liquid crystal cell 1 therebetween in such a manner that their respective alignment axes 7a and 4a are arranged parallel to and aligned with aligning treatment directions 16a and 19a on corresponding substrate sides of the homogeneous liquid crystal cell 1. As a result, residual retardation when the homogeneous liquid crystal cell 1 is turned on is more assuredly compensated as compared with the first embodiment. Moreover, optical axis arrangements, in-plane retardations and others of the front and rear retardation plates 8 and 9 are appropriately set in accordance with arrangement structures of the front and rear viewing angle compensating films 7 and 4.

That is, the front retardation plate 8 is a uniaxial retardation plate whose an in-plane retardation with respect to green wavelength light is 135±20 nm (i.e., 115 to 155 nm), and set in such a manner that its phase delaying axis 8a is positioned parallel to a horizontal direction 1h of a display surface as shown in FIG. 5. Therefore, the phase delaying axis 8a is perpendicular to the direction 16a of the aligning treatment applied to the front homogeneous aligning film of the liquid crystal cell 1.

Additionally, in regard to a refractive index anisotropy Δn of the front retardation plate 8 in accordance with each transmitted wavelength light, a ratio of a refractive index anisotropy Δnb with respect to blue wavelength light and a refractive index anisotropy Δng with respect to green wavelength light is as follows:

$$\Delta nb/\Delta ng=0.90\pm0.05$$

A ratio of a refractive index anisotropy Δnr with respect to red wavelength light and the refractive index anisotropy Δng with respect to green wavelength light is as follows:

$$\Delta nr/\Delta ng=1.05\pm0.05$$

That is, the refractive index anisotropies Δnr, Δng and Δnb of the front retardation plate 8 with respect to the respective wavelength lights of red, green and blue are set in such a manner that a value of the ratio Δnb/Δng falls within a range of 0.85 to 0.95 and a value of the ratio Δnr/Δng falls within a range of 1.00 to 1.10.

The rear retardation plate 9 is a biaxial retardation plate whose an in-plane retardation with respect to green wavelength light is 135±20 nm, and set in such a manner that its phase delaying axis 9a becomes perpendicular to the lateral direction 1h of the display surface, thus, parallel to the direction 19a of the aligning treatment applied to the rear homogeneous aligning film of the liquid crystal cell 1. Further, in regard to a refractive index anisotropy Δn of the rear retardation plate 9 for each transmitted wavelength light, a ratio of a refractive index anisotropy Δnb with respect to blue wavelength light and a refractive index anisotropy Δng with respect to green wavelength light is as follows:

$$\Delta nb/\Delta ng=1.05\pm0.05$$

A ratio of a refractive index anisotropy Δnr with respect to red wavelength light and the refractive index anisotropy Δng with respect to green wavelength light is as follows:

$$\Delta nr/\Delta ng=0.95\pm0.05$$

That is, the refractive index anisotropies Δnr, Δng and Δnb of the rear retardation plate 9 with respect to the respective wavelength lights of red, green and blue are set in such a manner that a value of the ratio Δnb/Δng falls within a range of 1.00 to 1.10 and a value of the ratio Δnr/Δng falls within a range of 0.90 to 1.00.

In this thus configured liquid crystal display device, the liquid crystal molecules do not vertically rise and enter an inclined alignment state in regions close to the front and rear homogeneous aligning films of the liquid crystal layer at the time of on, and hence residual retardation remains. However, the residual retardation due to the obliquely oriented liquid crystal molecules on both sides of the liquid crystal layer is assuredly compensated by the front and area viewing angle compensating films 7 and 4 arranged on both sides of the homogeneous liquid crystal cell 1. That is, in this embodiment, as described above, since the front and rear viewing angle compensating film 7 and 4 formed of the discotic liquid crystal are respectively arranged on both sides of the homogeneous liquid crystal cell 1 in such a manner that their respective alignment axes 7a and 4a are aligned in the same direction parallel to the aligning treatment directions 16a and 19a on the corresponding sides, the retardation remaining on both sides of the liquid crystal layer in the vertical direction can be assuredly compensated by the front and rear viewing angle compensating films 7 and 4.

Figure 6A:
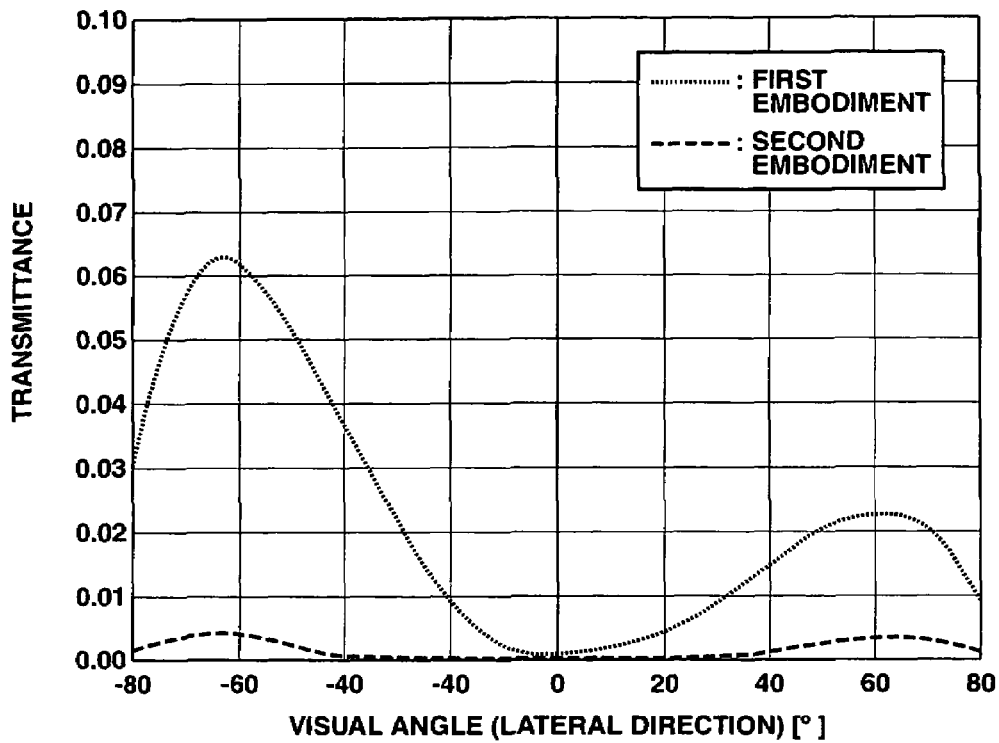
Figure 6B:
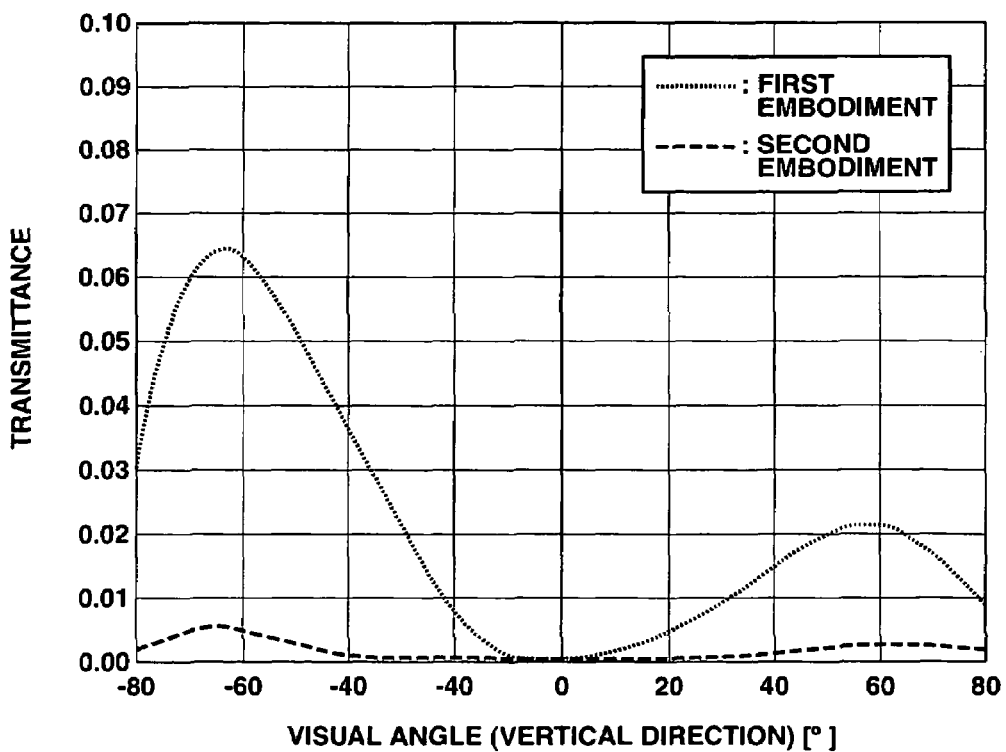

FIGS. 6A and 6B show characteristics of a change in light transmittance of the liquid crystal display device according to this second embodiment with respect to a viewing angle in each field direction, i.e., a lateral field direction and a vertical field direction at the time of on where an electric field is applied in comparison with the first embodiment. As apparent from these figures, in the liquid crystal display device according to the second embodiment, the light transmittance at the time of on is substantially fixed and maintained at the lowest level irrespective of a viewing angle in the respective field directions, i.e., the lateral field direction and the vertical field direction. This is very stable and low as compared with the same transmittance characteristics by the liquid crystal display device according to the first embodiment.

Figure 7:
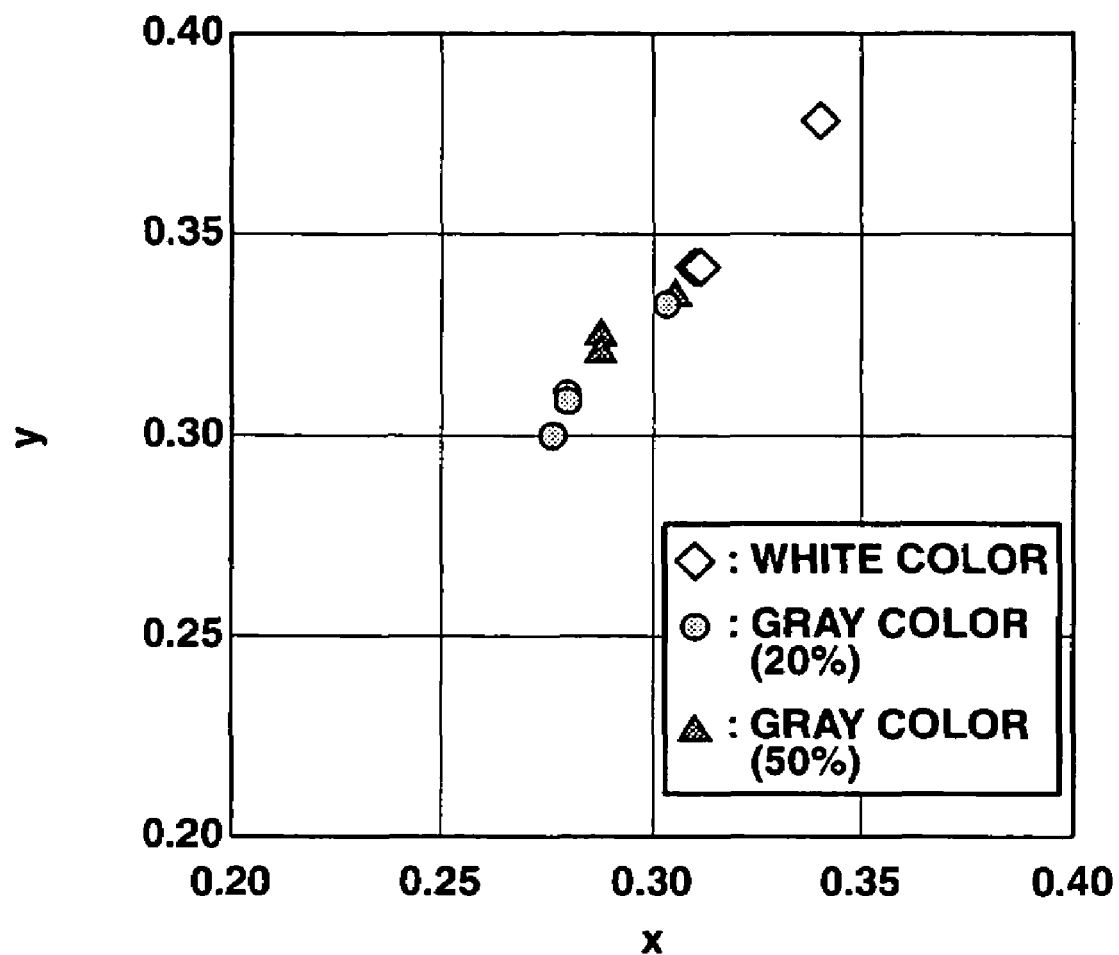
FIG. 7 is a chromaticity distribution map showing each chromaticity of a white color, a gray color with a 20% tone and a gray color with a 50% tone at a viewing angle of 45° in accordance with each field direction in the liquid crystal display device according to the second embodiment in the form of a CIE chromaticity diagram.

FIG. 7 shows respective chromaticities of a white color, a gray color with a 20% tone and a gray color with a 50% tone at a viewing angle of 45° in the respective field directions, i.e., the vertical and lateral directions in the liquid crystal display device according to this embodiment in the form of a CIE chromaticity diagram. As apparent from this FIG. 7, a hue shift of the liquid crystal display device according to this embodiment in the respective field directions is suppressed low.

Therefore, according to this liquid crystal display device according to the second embodiment, there can be demonstrated a valuable effect that high contrast can be substantially uniformly obtained and a viewing angle can be further increased in all field directions in addition to the excellent effect that high color display quality can be obtained with a hue shift suppressed in each field direction like the first embodiment.

Third Embodiment

Figure 8:
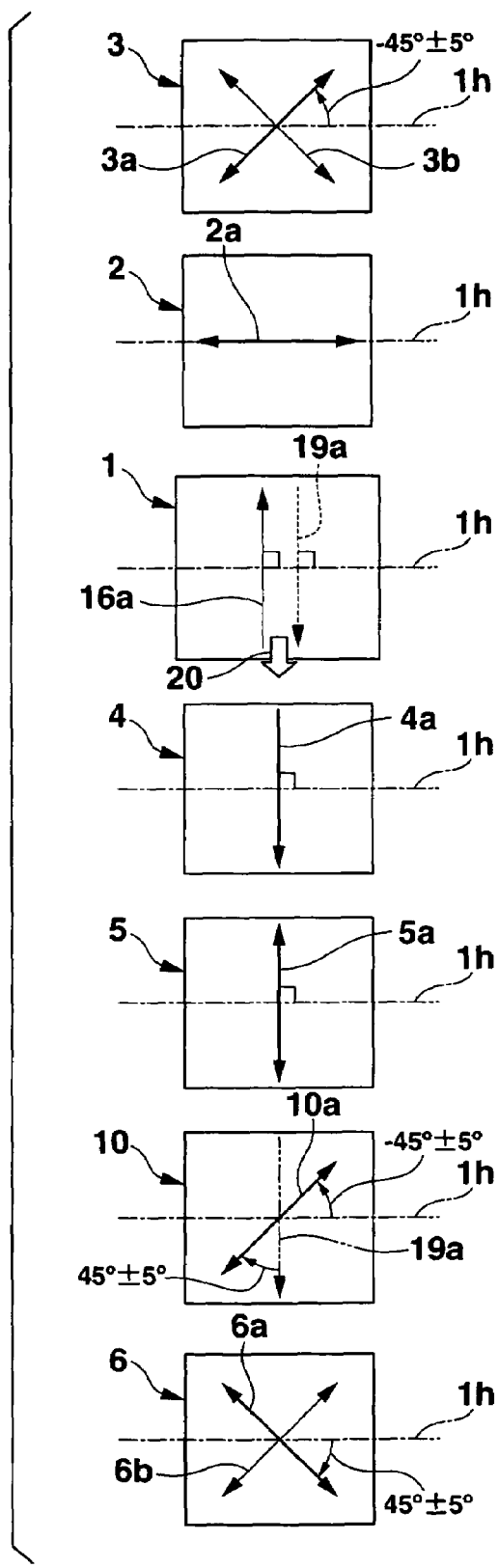
FIG. 8 is an exploded plan view showing a liquid crystal display device according to a third embodiment of the present invention.

As shown in FIG. 8, a liquid crystal display device according to the third embodiment has a structure in which a retardation plate 10 is additionally set between a rear retardation plate 5 and a rear polarizing plate 6 in addition to the structure of the liquid crystal display device according to the first embodiment. Here, the rear retardation plate 5 provided in the first embodiment is determined as a first rear retardation plate, and the additionally set z retardation plate 10 is determined as a second rear retardation plate. It is to be noted that a multigap structure of the homogeneous liquid crystal cell 1 is the same as the structure of the first embodiment, and Δn·d of each pixel of red, green or blue is set to fall within a range of 280 to 360 nm.

The additionally set second rear retardation plate 10 is the same biaxial retardation plate as the first rear retardation plate 5, has an in-plane retardation with respect to green wavelength light being 135±20 nm, and set in such a manner that its phase delaying axis 10a crosses a lateral direction 1h at −45±5°. Therefore, this phase delaying axis 10a is perpendicular to a transmission axis 6a of the rear polarizing plate 6, and crosses a direction 19a of aligning treatment applied to a rear homogeneous aligning film of the liquid crystal cell 1 at +45±5°. Furthermore, refractive indices nx, nz and ny of this second rear retardation plate 10 in three directions perpendicular to each other and refractive index anisotropies Δnb, Δng and Δnr of the second rear retardation plate 10 for respective wavelength lights are the same as those of the first rear retardation plate 5.

In the thus configured liquid crystal display device according to this embodiment, since the second rear retardation plate 10 is arranged to be adjacent to the rear polarizing plate 6 in such a manner that its phase delaying axis 10a becomes perpendicular to the transmission axis 6a of the rear polarizing plate 6, a retardation in a z direction of incident light is mainly compensated in this second rear retardation plate 10. As a result, occurrence of tone reversal in an intermediate tone in a direction 20 of a viewing angle which becomes a problem in particular can be further assuredly suppressed without affecting front characteristics of display.

Moreover, since liquid crystal display device according to this embodiment is provided with the structure of the liquid crystal display device according to the first embodiment, a hue shift in each field direction can be considerably suppressed like the liquid crystal display device according to the first embodiment.

Figure 9:
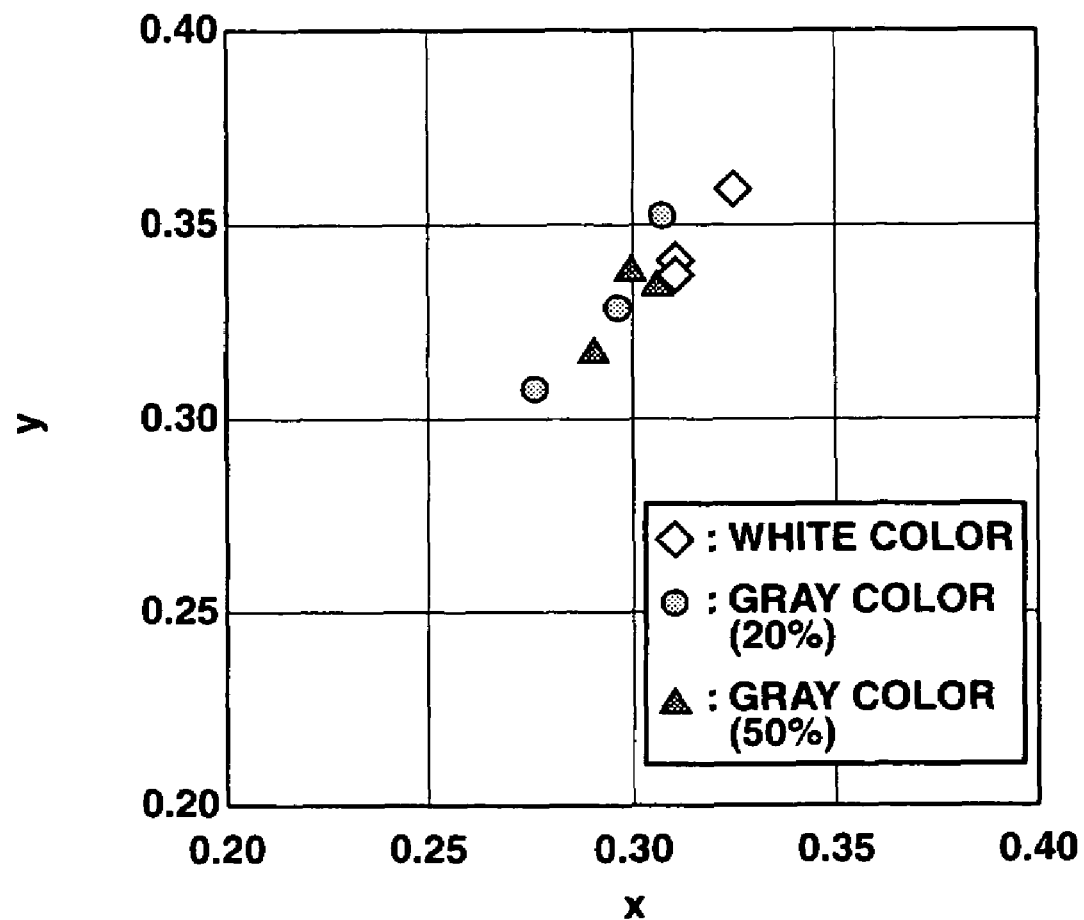
FIG. 9 is a chromaticity distribution map showing each chromaticity of a white color, a gray color with a 20% tone and a gray color with a 50% tone at a viewing angle of 45° in accordance with each field direction in the liquid crystal display device according to the third embodiment in the form of a CIE chromaticity chart.

FIG. 9 is a CIE chromaticity diagram showing respective chromaticities of a white color, a gray color with a 20% tone and a gray color with a 50% tone at a viewing angle of 45° in respective field directions, i.e., vertical and lateral directions in the liquid crystal display device according to this embodiment. As apparent from this FIG. 9, a hue shift in each field direction is suppressed low in the liquid crystal display device according to this embodiment.

Therefore, according to the liquid crystal display device according to the third embodiment, there can be demonstrated a valuable effect that occurrence of tone reversal in an intermediate tone in a viewing angle direction can be further assuredly suppressed in addition to the excellent effect that a high color display quality can be obtained with a hue shift suppressed in each field direction like the first embodiment.

The second rear retardation plate 10 may be set in such a manner that its phase delaying axis 10a becomes parallel with the transmission axis 6a of the rear polarizing plate 6. Additionally the second rear retardation plate 10 may be arranged between the front retardation plate 2 and the front polarizing plate 3 in such a manner that its phase delaying axis 10a becomes parallel to or perpendicular to the transmission axis 3a of the front polarizing plate 3. Further, the same retardation plate as the second rear retardation plate 10 may be arranged both between the front retardation plate 2 and the front polarizing plate 3 and between the rear retardation plate 5 and the rear polarizing plate 6 in the same optical axis arrangement. Effects demonstrated by these modifications of the third embodiment are the same.

The present invention is not restricted to the first to third embodiments. For example, the third embodiment is an embodiment in which the second rear retardation plate 10 is additionally arranged in the liquid crystal display device according to the first embodiment. However, the present invention is not restricted thereto, and the same retardation plate as the second rear retardation plate 10 according to the third embodiment may be set between the front polarizing plate 3 and the front retardation plate 8 and/or between the rear polarizing plate 6 and the rear retardation plate 9 in the liquid crystal display device according to the second embodiment in the same optical axis arrangement.

Furthermore, in the first to third embodiments, the uniaxial retardation plate is arranged as the front retardation plate, and the biaxial retardation plate is arranged as the rear retardation plate. However, the present invention is not restricted thereto, and the biaxial retardation plate may be arranged as the front retardation plate, and the uniaxial retardation plate may be arranged as the rear retardation plate. Moreover, the biaxial retardation plate or the uniaxial retardation plate may be used as both the front and second retardation plates.

Additionally, the description has been given as to the case where the light incidence side is the rear side of the homogeneous liquid cell in the first to third embodiments. However, the structures according to the first to third embodiments can be effectively established as the liquid crystal display device according to the present invention and the same effects can be demonstrated even if the light incidence side is reversed, i.e., even if light enters from the front polarizing plate 3 in the first embodiment, for example.

Further, the present invention is not restricted to the color liquid crystal display device in which color filters are provided, and it can be effectively applied to a liquid crystal display device which performs monochrome display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display device comprising:
   a first substrate having at least one first electrode on one side;
   a second substrate which has one side to face the one side of the first substrate, and has at least one second electrode which is provided on the one side to face the first electrode;
   a first aligning film which is arranged on the one side of the first substrate, and subjected to aligning treatment in a first direction;
   a second aligning film which is arranged on the one side of the second substrate, and subjected to aligning treatment in a second direction which is substantially parallel to and opposite to the first direction;
   a liquid crystal layer which is provided between the first aligning film and the second aligning film, and in which liquid crystal molecules are arranged in homogeneous alignment substantially without twist in accordance with the aligning treatment of the first and second aligning films when an electric field is not applied between the first and second electrodes, and which generates retardation which is substantially $\lambda/2$ with respect to transmitted light having a wavelength of $\lambda$;
   a first polarizing plate which is arranged on an opposite side of the first substrate, and arranged in such a manner that an optical axis of one of a transmission axis and an absorption axis is substantially matched with a direction crossing the first and second directions of the aligning treatment of the first and second aligning films at substantially 45°;
   a second polarizing plate which is arranged on an opposite side of the second substrate, and arranged in such a manner that an optical axis of one of a transmission axis and an absorption axis becomes substantially perpendicular to the optical axis of the first polarizing plate;
   a viewing angle compensating film formed of at least one discotic liquid crystal, the compensating film being arranged in at least one of a part between the first polarizing plate and the first substrate and a part between the second polarizing plate and the second substrate in such a manner that an optical axis which is a direction along which a refractive index becomes minimum in a plane parallel to its film surface is set parallel to the first direction and aligned with the aligning treatment applied to the aligning film of the substrate on an adjacent side; and
   at least one retardation plate which is arranged in at least one of a part between the first polarizing plate and the first substrate and a part between the second polarizing plate and the second substrate in such a manner that at least one of a phase delaying axis which is a direction along which a refractive index becomes maximum and a phase advancing axis which is a direction along which the refractive index becomes minimum in a plane parallel to its plate surface becomes substantially perpendicular to the aligning treatment applied to the aligning film of the substrate on an adjacent side.

2. The liquid crystal display device according to claim 1, further comprising:
   a viewing angle compensating film formed of a discotic liquid crystal which is arranged between the first substrate and the first polarizing plate in such a manner that its optical axis is set parallel to and aligned with the first direction of the aligning treatment applied to the first aligning film;
   a first biaxial retardation plate optically having two axes and arranged between the first viewing angle compensating film and the first polarizing plate in such a manner that a phase delaying axis which is a direction along which a refractive index becomes maximum in a plane parallel to its plate surface is set parallel to the first direction; and
   one uniaxial retardation plate optically having one axis and arranged between the second substrate and the second polarizing plate in such a manner that a phase delaying axis becomes perpendicular to the first direction.

3. The liquid crystal display device according to claim 2, wherein, in regard to refractive index anisotropies $\Delta nr$, $\Delta ng$ and $\Delta nb$ of the biaxial retardation plate for respective wavelength lights of red, green and blue, a value of a ratio $\Delta nb/\Delta ng$ is set to fall within a range of 1.00 to 1.10 and a value of a ratio $\Delta nr/\Delta ng$ is set to fall within a range of 0.90 to 1.00,
   in regard to refractive index anisotropies $\Delta nr$, $\Delta ng$ and $\Delta nb$ of the uniaxial retardation plate for respective wavelength lights of red, green and blue, a value of a ratio $\Delta nb/\Delta ng$ is set to fall within a range of 0.95 to 1.05 and a value of a ratio $\Delta nr/\Delta ng$ is set to fall within a range of 0.95 to 1.05, and
   a value of a product $\Delta n \cdot d$ of a refractive index anisotropy $\Delta n$ and a layer thickness d of the liquid crystal layer is set to fall within a range of 280 to 360 nm.

4. The liquid crystal display device according to claim 3, wherein a value of in-plane retardation of the uniaxial retardation plate with respect to green light is set within a range of 115 to 155 nm,
   a value of in-plane retardation of the biaxial retardation plate with respect to green light is set within a range of 60 to 140 nm which is less than that of the uniaxial retardation plate by 15 to 55 nm, and refractive indices nx and ny in two directions perpendicular to each other in a plane parallel to a plate surface of the biaxial retardation plate and a refractive index nz in a direction vertical to the plate surface are set to fall within a value range satisfying the following expression:

$-0.4 \leq (nx-nz)/(nx-ny) \leq 0.6$.

5. The liquid crystal display device according to claim 2, further comprising a second viewing angle compensating film formed of a discotic liquid crystal which is arranged between the second substrate and the second polarizing plate in such a manner that its optical axis is set parallel to and aligned with the direction of the aligning treatment applied to the second aligning film.

6. The liquid crystal display device according to claim 5, wherein, in regard to refractive index anisotropies $\Delta nr$, $\Delta ng$ and $\Delta nb$ of the biaxial retardation plate for respective wavelength lights of red, green and blue, a value of a ratio $\Delta nb/\Delta ng$ is set to fall within a range of 1.00 to 1.10 and a value of a ratio $\Delta nr/\Delta ng$ is set to fall within a range of 0.90 to 1.00, in regard to refractive index anisotropies $\Delta nr$, $\Delta ng$ and $\Delta nb$ of the uniaxial retardation plate for respective wavelength lights of red, green and blue, a value of a ratio $\Delta nb/\Delta ng$ is set to fall within a range of 0.85 to 0.95 and a value of a ratio $\Delta nr/\Delta ng$ is set to fall within a range of 1.00 to 1.10, and a value of a product $\Delta n \cdot d$ of a refractive index anisotropy $\Delta n$ and a layer thickness d of the liquid crystal layer is set to fall within a range of 280 to 360 nm.

7. The liquid crystal display device according to claim 6, wherein a value of an in-plane retardation Re of each of the biaxial retardation plate and the uniaxial retardation plate with respect to green light is set to fall within a range of 115 to 155 nm, and refractive indices nx and ny in two directions perpendicular to each other in a plane parallel to a plate surface of the biaxial retardation plate and a refractive index nz in a direction vertical to the plate surface are set to fall within a range satisfying the following expression:

$-0.4 \leq (nx-nz)/(nx-ny) \leq 0.6$.

8. The liquid crystal display device according to claim 2, further comprising a second biaxial retardation plate optically having two axes which is arranged between the first biaxial retardation plate and the first polarizing plate in such a manner that a phase delaying axis which is a direction along which a refractive index becomes maximum in a plane parallel to its plate surface faces a direction crossing the phase delaying axis of the first biaxial retardation plate at an angle of substantially 45°.

9. The liquid crystal display device according to claim 2, wherein, in regard to refractive index anisotropies $\Delta nr$, $\Delta ng$ and $\Delta nb$ of the first biaxial retardation plate and the second biaxial retardation plate for respective wavelength lights of red, green and blue, a value of a ratio $\Delta nb/\Delta ng$ is set to fall within a range of 1.00 to 1.10 nm, in regard to refractive index anisotropies $\Delta nr$, $\Delta ng$ and $\Delta nb$ of the uniaxial retardation plate for respective wavelength lights of red, green and blue, a value of a ratio $\Delta nb/\Delta ng$ is set to fall within a range of 0.95 to 1.05 nm and a value of a ratio $\Delta nr/\Delta ng$ is set to fall within a range of 0.95 to 1.05 nm, and a value of a product $\Delta n \cdot d$ of a refractive index anisotropy $\Delta n$ and a layer thickness d of the liquid crystal layer is set to fall within a range of 280 to 360 nm.

10. The liquid crystal display device according to claim 2, wherein color filters having a plurality of colors which selectively transmit different wavelength lights therethrough are respectively arranged in accordance with respective pixel portions where the respective electrodes of the first and second substrates face each other, and liquid crystal layer thicknesses are set to different values in accordance with the pixel portions corresponding to the color filters of different colors.

11. A liquid crystal display device comprising:

a first substrate having at least one first electrode formed thereon;

a second substrate which is arranged to face an inner surface of the first substrate on which the first electrode is formed, and has at least one second electrode facing the first electrode formed on an inner surface facing the first substrate;

a first aligning film which is subjected to aligning treatment in a predetermined first direction on the inner surface of the first substrate where the first electrode is formed;

a second aligning film which is subjected to aligning treatment in a second direction which is substantially parallel to and opposite to the first direction on the inner surface of the second substrate where the second electrode is formed;

a liquid crystal layer which is held between the first aligning film and the second aligning film, in which liquid crystal molecules are arranged in homogeneous alignment substantially without twist in accordance with the aligning treatment of the first and second aligning films when an electric field is not applied between the first and second electrodes, and which generates retardation which is substantially $\lambda/2$ with respect to transmitted light having a wavelength of $\lambda$;

a first polarizing plate which is arranged on an outer side of the first substrate, and arranged in such a manner that its transmission axis is substantially matched with a direction crossing the first direction of the aligning treatment applied to the first aligning film of the first substrate at substantially 45°;

a second polarizing plate which is arranged on an outer side of the second substrate, and arranged in such a manner that its transmission axis becomes substantially perpendicular to an optical axis of the first polarizing plate;

a first viewing angle compensating film formed of a discotic liquid crystal which is arranged between the first polarizing plate and the first substrate in such a manner that its optical axis which is a direction along which a refractive index becomes minimum in a plane parallel to its film surface is set parallel to and aligned with the first direction;

a second viewing angle compensating film formed of a discotic liquid crystal which is arranged between the second polarizing plate and the second substrate in such a manner that its optical axis which is a direction along which a refractive index becomes minimum in a plane parallel to its film surface is set parallel to and aligned with the second direction;

a first retardation plate which is arranged between the first polarizing plate and the first viewing angle compensating film in such a manner that its phase delaying axis along which a refractive index becomes maximum in a plane parallel to its plate surface is set substantially parallel to the first direction of the aligning treatment applied to the first aligning film; and a second retardation plate which is arranged between the second polarizing plate and the second viewing angle compensating film in such a manner that its phase delaying axis which is a direction along which a refractive index becomes maximum in a plane parallel to its plate surface becomes substantially perpendicular to the second direction of the aligning treatment applied to the second aligning film.

12. The liquid crystal display device according to claim 11, wherein the first retardation plate has a biaxial retardation plate whose in-plane retardation with respect to green wavelength light is set to fall within a range of 115 to 155 nm.

13. The liquid crystal display device according to claim 11, wherein the second retardation plate has a uniaxial retardation plate whose in-plane retardation with respect to green wavelength light is set to fall within a range of 115 to 155 nm.

14. A liquid crystal display device comprising:
a first substrate having at least one first electrode formed thereon;
a second substrate which is arranged to face an inner side of the first substrate where the first electrode is formed, and has at least one second electrode facing the first electrode on an inner side facing the first substrate;
a first aligning film which is subjected to aligning treatment in a predetermined first direction on the inner side of the first substrate where the first electrode is formed;
a second aligning film which is subjected to aligning treatment in a second direction which is substantially parallel to and opposite to the first direction on the inner side of the second substrate where the second electrode is formed;
a liquid crystal layer which is held between the first aligning film and the second aligning film, in which liquid crystal molecules are arranged in homogeneous alignment substantially without twist in accordance with the aligning treatment of the first and second aligning films when an electric field is not applied between the first and second electrodes, and which generates retardation which is substantially $\lambda/2$ with respect to transmitted light having a wavelength of $\lambda$;
a first polarizing plate which is arranged on an outer side of the first substrate, and arranged in such a manner that its transmission axis is substantially matched with a direction crossing the first direction of the aligning treatment applied to the first aligning film of the first substrate at substantially 45°;
a second polarizing plate which is arranged on an outer side of the second substrate, and is arranged in such a manner that its transmission axis becomes substantially perpendicular to the transmission axis of the first polarizing plate;
a first viewing angle compensating film formed of a discotic liquid crystal which is arranged between the first polarizing plate and the first substrate in such a manner that its optical axis which is a direction along which a refractive index becomes minimum in a plane parallel to its film surface is set parallel to and aligned with the first direction;
a first retardation plate which is arranged between the first polarizing plate and the first viewing angle compensating film in such a manner that its phase delaying axis which is a direction along which a refractive index becomes maximum in a plane parallel to its plate surface is set substantially parallel to the first direction of the aligning treatment applied to the first aligning film;
a second retardation plate which is arranged between the second polarizing plate and the second substrate in such a manner that its phase delaying axis which is a direction along which a refractive index becomes maximum in a plane parallel to its plate surface becomes substantially perpendicular to the second direction of the aligning treatment applied to the second aligning film; and
a third retardation plate arranged between the first polarizing plate and the first retardation plate in such a manner that its phase delaying axis which is a direction along which a refractive index becomes maximum in a plane parallel to its plate surface becomes perpendicular to the transmission axis of the first polarizing plate.

15. The liquid crystal display device according to claim 14, wherein the third retardation plate has a biaxial retardation plate whose in-plane retardation with respect to green wavelength light is set to fall within a range of 115 to 155 nm.

16. The liquid crystal display device according to claim 15, wherein refractive indices nx and ny in two directions perpendicular to each other in a plane parallel to a plate surface of the biaxial retardation plate and a refractive index nz in a direction vertical to the plate surface are set to values in such a manner that a value of $(nx-nz)/(nx-ny)$ satisfies a range of 0.5 to 1.5.

* * * * *